April 13, 1954
R. C. RUHLAND
2,675,512
MOTOR CONTROL APPARATUS
Filed Feb. 24, 1953
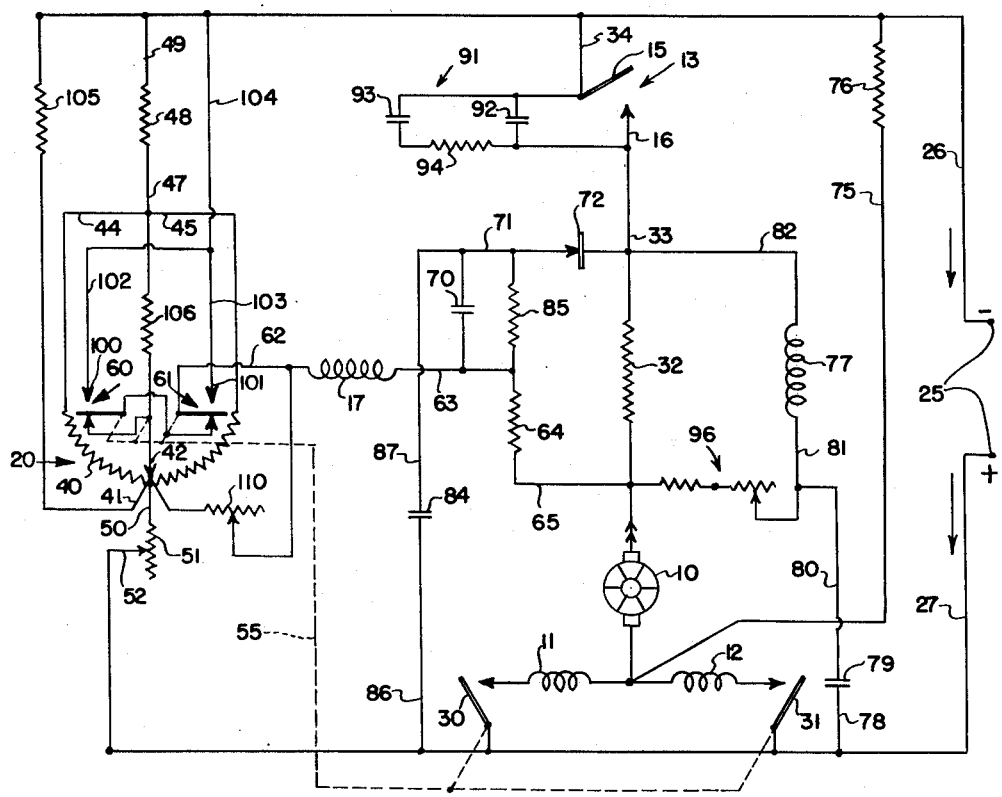
*INVENTOR.*
ROMAN C. RUHLAND
BY
George H. Fisher
*ATTORNEY*

Patented Apr. 13, 1954

2,675,512

UNITED STATES PATENT OFFICE 2,675,512

MOTOR CONTROL APPARATUS

Roman C. Ruhland, St. Louis Park, Minn., assignor to Minneapolis-Honeywell Regulator Company, Minneapolis, Minn., a corporation of Delaware Application February 24, 1953, Serial No. 338,459

19 Claims. (Cl. 318—257)

1

My invention relates to improvements in motor control apparatus and in particular to the type of motor control apparatus disclosed in the copending application of Robert J. Kutzler, Serial No. 310,066 filed Septeember 17, 1952, wherein speed control of the motor is obtained by applying pulsed increments of electrical energy to a motor.

Control of the speed of operation of an electric motor through the variation in the amount of energizing power the motor receives is an accepted process, particularly in the field of direct current motors. Speed control through the application of pulsed increments of power has previously been accomplished such as in the above mentioned Kutzler application. Up to the present time, however, the known methods and apparatus for controlling the speed of operation of electric motors have all proved inadequate for certain applications in that they lack complete uniformity of control over the entire speed range of operation of the motor. This is particularly true where linearity over the entire speed response range of operation is desired. The application of pulsed increments of power through the apparatus disclosed in the above named Kutzler application, attempts to solve this problem by varying the pulsed increments of power and the frequency at which they are applied, but fail to adequately control the motor at lower ranges of speed. Therefore it is an object of this present invention to provide an improved motor control apparatus of the type disclosed in the above named Kutzler application which will provide any desired response over the entire operation of a motor.

It is also an object of this invention to provide in a motor control apparatus means for varying the pulsed increments of power supplied to a motor armature for speed control purposes by controlling the period of time during which the power is supplied to the motor, the period of time during which the motor is deenergized and the frequency of the pulsed application of power to the motor.

It is further an object of this invention to provide an improved motor control apparatus with linearity of response or speed torque curves over the entire range of operation.

It is also an object of this invention to provide in an improved motor control apparatus of the pulsing relay type controlled primarily by a primary controller with additional resistance-capacitance circuits which are energized when power is applied with the motor armature and

2 which cooperate with the primary controller and the motor armature to form a discharge path through the operating coils of the pulsing relay to modify the effect of the primary controller and thereby vary the increments of power supply to the motor.

These and other objects of this invention will become apparent from a reading of the attached description together with the drawing.

My invention, as indicated above, relates to improved motor control apparatus of the type disclosed in the copending application of Robert J. Kutzler which is of the pulsing relay type. Referring to the drawing, it will be seen that my improved pulsing relay circuit includes an armature 10 of the motor to be controlled, directiontal field windings 11 and 12 of the motor, contact mechanism or circuit closure means 13 in the form of a movable contact 15 and a stationary contact 16, an energizing coil 17 for the relay, the electromagnetic structure which is not shown and a primary controller or potentiometer 20. This system is energized from a D. C. source of power, which is generally shown at 25, having buss bars 26 and 27 connected thereto. Armature 10 of the motor whose speed is to be controlled is energized through an energizing circuit from the plus side of the source 25 through conductor 27 to a pair of directional switches 30, 31 connected to directional field windings 11 and 12, armature 10, to a resistor 32 and conductor 33 to stationary contact 16 of relay 13, and from movable contact 15 to conductor 34, buss bar 26 to the negative side of the supply. The operation of the relay or its contact means 15 and 16 to close this energizing circuit and supply power to the motor armature is controlled primarily by the energization coil 17 of the relay. Relay coil 17 is energized through from the primary controller 20 which includes a potentiometer winding 40, center tapped at 41, and having a wiper 42 in operative association therewith. The extremities of the winding 40 are connected together by conductors 44 and 45 with the common extremity of the winding being connected to buss bar 26 by a conductor 47, resistor 48, and conductor 49. Potentiometer winding 40 is connected to the opposite side of the source or buss bar 27 at its center tap 41 through a conductor 50, dead spot resistor or potentiometer 51 and conductor 52. It will be noted that the extremities of the potentiometer winding are connected together to a common side of the source therefore being energized at the same potential while the center tap is connected to the opposite side of the source of power consequently providing an arrangement in which each half of the potentiometer winding is similarly energized and in the same direction or with the same electrical polarity. Mechanically connected to the potentiometer wiper 42 through a mechanical connection indicated at 55 are the field switches 30 and 31 one of which will be operative when the potentiometer wiper 42 moves to one side of the center tap 41 and the other operative when the potentiometer wiper 42 moves to the opposite side of the center tap 41. This basic circuit becomes operative when the potentiometer wiper is moved to one or the other side of the potentiometer winding 40 from the dead spot 41 placing the signal potential from controller 20 on the coil 17 which is connected to the wiper 42 through a pair of single pole, double throw switches 60 and 61, the purpose of which will be explained as the description proceeds. For the present purposes of explanation, it will be assumed that these switches will not part from their operating position and consequently the coil 17 will be connected from the wiper 42 through switch 60 in its normally closed position, through switch 61 in its normally closed position to conductor 62, coil 17, conductor 63, resistor 64, conductor 65, to armature 10 and armature 10 through field windings 11, 12, switches 31, 32 and conductor 27. Movement of the wiper from either side of the potentiometer center tap 41 will cause current to flow from the conductor 27 through this energizing circuit to coil 17 and potentiometer wiper 42, potentiometer winding 40, conductors 44, 45, conductor 47, resistor 48, conductor 49 and buss bar 26. Current will then flow through the relay coil and when the current flow has reached the point where the relay will pull in, the contacts 15 and 16 will be actuated to a closed position supplying power to the energizing circuit of the motor from buss bar 27, switches 30 or 31, winding 11 or 12, armature 10, resistor 32, conductor 33, contacts 15 and 16, conductor 34 to buss bar 26. It will be appreciated that one or the other of the switches 30 and 31 will be closed as soon as the potentiometer departs from the center tap point through operation of the mechanical connection 55. Current flow through the coil 17 operates to close the relay contacts 15, 16 which sets up a second energising circuit for the relay coil in the direction tending to urge the contact mechanism toward the out or open position. This circuit extends from buss bar 27, to conductor 52, dead spot resistor 51, conductor 50, potentiometer winding 40, wiper 42, switches 60 and 61, conductor 62, coil 17, a condenser 70, conductor 71, rectifier 72, conductor 33, contacts 15, 16, conductor 34, to buss bar 26. The purposes of the condenser 70 and rectifier 72 as well as the dead spot resistor 51 will be described in detail as the disclosure proceeds but for the present it may be considered that they merely serve to connect this circuit through the contact mechanism or relay 13 to buss bar 26 for the purpose of energizing the relay coil in an out direction. Energization in this direction will have caused the relay to open terminating this second or energizing circuit for the relay as well as the energizing circuit for the motor and leaving only the first named energizing circuit for the relay coil 17 in the opposite direction which will tend to cause the relay to pull in and repeat the cycle. Movement of the wiper 42 away from the center tap 41 will decrease the impedance in the energizing circuit for the coil 17 in the in direction and increase the impedance for the coil 17 in the out circuit path or in the circuit tending to energize the coil and urge the contacts to the open position. Under these conditions, the relay contacts will stay in the closed position longer because of the greater time required to build up enough current in the out direction for the energization of the coil 17 in the second named energizing circuit. With the relay contacts made for longer percentage of time, the average current through the motor will increase and consequently the motor will run faster. A certain amount of speed regulation is inherent in this system in that the back E. M. F. or counter E. M. F. of the motor will decrease the in current as the motor approaches the speed called for by the position of the potentiometer wiper 42 on winding 40. When the wiper 42 is set in a certain position, the current tending to pull the relay in will have a certain value before the motor begins to rotate. As the motor starts to rotate and build up speed its effective impedance will increase due to the counter E. M. F. of the armature and reduce the current in the energizing circuit for coil 17 which includes the armature 10 or the circuit tending to pull the relay in. Thus as motor speed picks up, the current tending to open the relay does not have to build up to as high a value as it would if the motor were not turning in order to drop out the relay. It will also be seen that if the motor were to become loaded it would not turn as fast and less counter E. M. F. would be generated, thus the relay would tend to hold in longer increasing the average motor current and the motor will have increase in torque.

Two directional control of the motor is achieved through operation of the switches 31 and 32 and the energization of the coils 11 and 12 which are selectively energized depending upon the position of the wiper 42 on the winding 40 or the direction of operation of the primary controller or potentiometer 20. In the present disclosure, the field windings are connected in series with the motor armature but it should be understood that they may be separately energized in the parallel circuit independent of the armature if desired. With the potentiometer winding identical in both directions due to the center tapping and the energization of the potentiometer at the center tap and the common extremities, identical portions are obtained on the potentiometer winding and handle or wiper displacement in either direction will produce identical motor response but in opposite directions due to the opposite or selective energization of the field coils. The dead spot resistor 50 which is included in this circuit provides for minimum speed control and is placed there to eliminate electrical dead spots in the potentiometer 20. Should the tap connection be connected directly to the plus side of the supply or to buss bar 27 the wiper 42 would have to be moved a predetermined distance before enough current would flow through the relay coil 17 to actuate the contact mechanism. By adding a variable resistance between the center tap 41 and the buss bar 27 this point is placed at a potential below the potential of the buss bar 26 and is adjusted so that very slight displacements from the center tap 41 by the wiper 42 will produce sufficient voltage across the coil 17 to actuate the contact mechanism 13.

It will also be noticed that the field windings 11 and 12 are connected through a conductor 75 and a resistor 76 to buss bar 26 in a circuit which shunts the armature 10 and relay contacts 15 and 16. This circuit with its resistance is provided simply to insure current to the motor fields whenever the switches 30, 31 are actuated. The amount of current supplied by this circuit improves the motor characteristics and provides for increased speed torque regulation.

Relay 13 is also provided with a coil 77 which is energized from buss bar 27 through a conductor 78, condenser 79, conductor 80, conductor 81, coil 77, conductor 82 to conductor 33, contacts 15 and 16, conductor 34 to buss bar 26. This second relay coil is provided to obtain good contact operation with positive contact closure and opening of the contact mechanism 13. The condenser 79 is provided in series with this coil to provide a high transient surge through the coil. However, this circuit has no initial effect on the operation of the relay until after the contacts 15 and 16 have closed and energization of the coil is in such direction as to slam or urge the contacts 15, 16 into further engagement in a snap action type of operation making good contact therebetween. Besides increasing the contact closure characteristics of the contact mechanism, the condenser 79 and the coil 77 further tend to increase the on time of the relay. When the contacts 15, 16 open, condenser 79 discharges through a path which includes the switch 30 or 31, field windings 11 or 12, armature 10, resistor 38, conductor 82, coil 77, conductor 81 and conductor 80 to the condenser 79 which discharge energizes coil 77 in a circuit opening direction to provide for snap action of the contact mechanism in the opening direction. In order to provide for very low speeds when the wiper 42 is displaced very slightly to the center tap 41 on winding 40, the on time of the relay must be held to a very short period. The inclusion of condenser 70 and resistor 64 in the energizing circuit of coil 17 both in the in and out directions serve this function. The condenser 70 which is included in the energizing circuit in series with coil 17 for energization of coil 17 when the contacts 15 and 16 of the relay are closed and which energizes the coil toward the out direction provides for a high transient path in this direction which current flow tends to drop out the relay. Thus the instant the contact is closed, this condenser 70 has the effect of causing them to open immediately and overcome the tendency of the condenser 79 and winding 77 when the contacts are closed to hold the relay contacts closed for a longer period of time. The resistance 64 which is included in the energizing circuits of the coil 17 and connected between the coil 17 and the armature 10, in circuit to energize the coil in the in direction, serves as a current block to prevent too great a portion of transient current to the condenser 70 from passing through the motor instead of coil 17. Both of the circuits involving the condensers 70 and 79 are RLC circuits. The time constant of such a circuit is proportional to the resistance of the circuit. Since there is no resistance in the circuit involving condenser 79 other than the resistance of coil 77 in the circuit closure direction its time constant is lower than the circuit involving condenser 70 which has the dead spot resistor 71 and some resistance from the potentiometer winding 40 added. Thus the action of the condenser 79 is faster than that of the condenser 70 and it will always provide positive relay action. The action due to condenser 70 will come at some instant after the relay has slammed in and overcome the tendency to hold in for too long a period of time. As the wiper 42 is moved up the potentiometer or away from the dead spot 41, that is greater on time being called for, the resistance of the RLC circuit of condenser 70 is increased and the time constant is likewise increased thereby decreasing the effects of the condenser 70. Its effect is greatest at low displacements of the potentiometer wiper 42 where such action is desired. The action of coil 77 in the discharge circuit of condenser 79 always insures positive circuit opening or snap action of contacts 15, 16 in the open direction, however. At the same time that a very short on time of the relay is obtained, it is desirable to have a long off time or circuit open position of the contacts 15 and 16. If the off time is short then the on time pulses have to be very small to reduce the average current through the motor and consequently the motor speed. To obtain the long off time, a condenser 84, resistor 85, and the rectifier 72 have been added to the circuit. Condenser 84 is connected to buss bar 27 through a conductor 86 and through a conductor 87 to one side of the condenser 70, resistor 85 and conductor 71. The resistor 85 is connected at its opposite extremity to conductor 63 and the opposite side of condenser 70. Rectifier 72 as previously indicated is included in series with the condenser 70 and contacts 15 and 16 in the energizing circuit for coil 17 which tends to energize the coil 17 in the out direction. When the contacts 15 and 16 are made, the condenser 84 charges through a circuit from buss bar 27, conductor 86, condenser 84, conductor 87, conductor 71, rectifier 72, conductor 33, contacts 15 and 16, conductor 34, to buss bar 26. When the contacts 15, 16 are opened, the rectifier 72 prevents discharge of the condenser 84 through a circuit including motor armature 10 and resistor 32 and consequently the condenser 84 must discharge through the dead spot resistor 51 a portion of the potentiometer winding 40, coil 17 in a direction to hold the relay out, and due to the high resistance in the discharge path this circuit has a high time constant. This discharge circuit extends from condenser 84, conductor 86, buss bar 27, conductor 52, resistor 51, conductor 50, winding 40, wiper 42, switches 60, 61, conductor 62, coil 17, conductor 63, resistor 85, conductor 71, conductor 87 to the condenser 84.

Thus at low displacements of the potentiometer wiper 42 on winding 40, the current in the in direction is small and the discharge current of condenser 84 tends to hold the relay 13 open for a relatively long period of time. As the handle is displaced more from the center tap 41 on the winding 40, the in current becomes greater and tends to overcome the effect of the condenser 84.

As previously explained, the basic circuit has a certain amount of inherent speed regulation. In order to increase this speed regulation and to exercise further control over the same, an adjustable resistance 96 is added to the control circuit, this resistor being connected between the armature 10 and conductors 80, 81 connecting the resistor to coil 77. The resistor 96 provides a shunt path across the resistor 32 and provides for a certain current flow through the coil 77 the amount being regulated by the value of the adjustable resistance 96. This current flow is in a direction to make the relay hold in longer, that is it energizes coil 77 in the same direction as the energizing path for relay coil 17 through the condenser 79. It can be readily seen that as the current to resistor 32 increases so will the current to coil 77. Thus, if the motor slows down as the load increases with given displacements of the wiper 42 of the primary controller 20, the counter E. M. F. generated at the motor armature will decrease and the current through resistor 32 and coil 77 will increase. This will increase the on time of the relay 13, that is, provide for a longer closure of contacts 15 and 16 and a greater average of current to the motor armature 10, consequently increase the motor torque to overcome the loading.

An arc suppression circuit indicated at 91 and including condenser 92, 93 and a resistance 94 are connected across the contacts 15 and 16 to prevent material transfer or pitting of the contacts. This arc suppression circuit is conventional and forms no part of the present invention.

It will be seen thus far that operation of the primary controller, that is the movement of the wiper 42 on the winding 40 acts initially to energize the coil of relay 17 in the in direction causing the contacts 15 and 16 to close and the motor armature to be energized and simultaneously therewith the closure of one or the other of the contacts 30, 31 for the field winding 11, 12 to permit energization to the field windings to control the direction of rotation of the motor. The potentiometer 20 serves further as an adjustment in an RLC circuit to determine the effect of the additional energizing circuit on the coil 17 of the relay varying the period of time during which the relay contact mechanism is pulled in, the period of time during which the relay contact mechanism is dropped out and the frequency at which the relay pulses. The circuitry for the coil 17 for both the in and out energization thereof was completed in part through the in contacts of switches 60, 61, which are to be identified as slewing or fast speed switches. The switches are shown herein as single pole double throw switches operatively connected to the wiper of the potentiometer 42 for operation therewith. The stationary portion of the out contacts of these switches are identified as 100 and 101 and are connected together at a common point by conductors 102, 103 and to the buss bar 26 by conductor 104. These slewing switches are designed to be operated only when the wiper 42 is displaced over a predetermined range of displacement of the wiper on the potentiometer winding from the center tap 41. This predetermined displacement as shown herein to be maximum displacement of the wiper 42 on the winding 40 at which point one or the other of the switches 60, 61 will be operated depending upon the direction of movement of the wiper 42 to engage the respective out contacts 100 or 101 and set up an auxiliary shunting circuit around the primary controller through the conductor 104 from buss bar 26 and conductors 102 or 103, contacts 100 or 101 and the remainder of switches 60 or 61 to conductor 62 and coil 17 of the relay 13. Thus, when the slewing switches or high speed switches are actuated, the relay coil is switched from the wiper of the potentiometer or controller 20 directly to the negative line or buss bar 26 and the relay pulls in solid resulting in maximum speed of the motor. Slightly greater sensitivity for the primary controller 20 is obtained by the use of the resistor 105 which is connected at one extremity to the buss bar 26 and at its other extremity to center tap 41 of winding 40 in that its results as a shunt across the potentiometer 20 and resistance 48 which is in series relation therewith making it possible to use lower values of resistance in the dead spot resistor 50. The resistor 105 may be omitted if desired. Similarly a resistor 106 connecting the wiper 42 to the extremities of winding 40 of the potentiometer 20 at conductor 47 is connected in series with resistor 48 and to buss bar 26 to provide for varying the characteristics of the speed torque curve of the motor. It is effectively shunted out as the wiper 42 moves toward one end or the other of the winding 40 and hence is most effective at small handle displacements becoming less and less effective as the wiper 42 is displaced over wider ranges of the winding 40. Its inclusion in the circuit is optional also.

A resistor 110 connected at one extremity to the center tap 41 of winding 40 and at the other extremity to conductor 62 and coil 17 is provided for a maximum speed control limit for the motor apparatus. It is shunted from the wiper 42 to the center tap of the potentiometer winding 40 and is adjustable to vary the upper speed limit of the motor operation through the slewing or high speed switches. At low handle displacements the resistance of resistors 110 is high compared with the resistance between the center tap of the potentiometer and the wiper 42 and has little effect on the low end of the speed response curve of the motor. As the resistance of resistance 110 is increased the slope of the response curve is similarly changed. At the same time the top or slewing speed of the motor is raised. As the value of resistor 110 is decreased, the slope of the speed torque curve becomes less and the top speed of the motor is cut down and the sensitivity of the handle is reduced. This addition to the control circuit is also optional and only modifies with resistor 105 and the resistor 106 the speed torque characteristic of the apparatus.

It should be understood that the wiper 42 and the switches 30, 31 are operated simultaneously and throuh suitable means such as a handle or master control which is not shown. Similarly the slewing or high speed switches are actuated at the predetermined ranges of movement of the master control.

In considering this invention it should be kept in mind that the present disclosures are to be illustrative only and the scope of the invention is to be determined only by the appended claims.

I claim as my invention:

1. In motor control apparatus: a motor whose speed is to be controlled, said motor having an armature and a directional field winding; an energizing circuit means for said motor adapted to be connected to a source of power and including a circuit closure means operated by a pair of windings; a primary controller adapted to be connected to said source of power; first circuit means including said primary controller and one of said windings, said armature and said directional field windings connected across source of power and adapted to operate said circuit closure means to a closed position completing said energizing circuit for said motor upon operation of said primary controller; second circuit means including the other of said windings, a condenser and said circuit closure means connected across said source of power and operative upon closure of said circuit closure means to energize said other of said windings to urge said circuit closure means toward the closed position; a third circuit means including said primary controller, said one of said windings, a second condenser, a rectifier and said circuit closure means connected across said source of power and operative upon closure of said circuit closure means to energize said one of said windings in an opposite direction from that of said first circuit means tending to operate said circuit closure means toward an open position.

2. In motor control apparatus: a motor whose speed is to be controlled, said motor having an armature and a directional field winding; an energizing circuit means for said motor adapted to be connected to a source of power and including a circuit closure means operated by a pair of windings; a primary controller adapted to be connected to said source of power; first circuit means including said primary controller and one of said windings, said armature and said directional field windings connected across said source of power and adapted to operate said circuit closure means to a closed position completing said energizing circuit for said motor upon operation of said primary controller; second circuit means including the other of said windings, a condenser and said circuit closure means connected across said source of power and operative upon closure of said circuit closure means to energize said other of said windings to urge said circuit closure means toward the closed position; third circuit means including said primary controller, said one of said windings, a second condenser, a rectifier and said circuit closure means connected across said source of power and operative upon closure of said circuit closure means to energize said one of said windings in an opposite direction from that of said first circuit means tending to operate said circuit closure means toward an open position, and a resistance capacitance circuit means connected across said source of power when said circuit closure means is in a closed position and discharging through said one of said windings in such a direction as to urge said circuit closure means toward an open position.

3. In motor control apparatus: a motor whose speed is to be controlled, said motor having an armature and a directional field winding; an energizing circuit means for said motor adapted to be connected to a source of power and including a circuit closure means operated by a pair of windings, a primary controller adapted to be connected to said source of power; first circuit means including said primary controller and one of said windings, said armature and said directional field windings connected across said source of power and adapted to operate said circuit closure means to a closed position completing said energizing circuit for said motor upon operation of said primary controller; second circuit means including the other of said windings and an energization modifying means connected across said source of power upon operation of said circuit closure means to a closed position and operative to energize said other of said windings in one direction to initially urge such circuit closure means toward said circuit closure position and upon opening of said circuit means to energize said other of said windings in an opposite direction to urge said circuit closure means toward said open position; third circuit means including said primary controller, said one of said windings, a second energization modifying means and said circuit closure means connected across said source of power and operative upon closure of said circuit closure means to energize said one of said windings in an opposite direction tending to urge said circuit closure means toward an open position; an energization storing circuit means connected across said supply when said circuit closure means is operated to a circuit closure position and discharging through said one of said windings in such a direction as to urge said circuit closure means toward said open position.

4. In motor control apparatus: a motor whose speed is to be controlled, said motor having an armature and a directional field winding; an energizing circuit means for said motor adapted to be connected to a source of power and including a circuit closure means operated by a pair of windings; a primary controller adapted to be connected to said source of power; first circuit means including said primary controller and one of said windings, said armature and said directional field windings connected across said source of power and adapted to operate said circuit closure means to a closed position completing said energizing circuit for said motor upon operation of said primary controller; second circuit means including the other of said windings, and energization modifying means and said circuit closure means connected across said source of power and operative upon operation of said circuit closure means to a closed position to energize said other of said windings to initially urge such circuit closure means toward said circuit closure position; third circuit means including said primary controller, said one of said windings, a second energization modifying means and said circuit closure means connected across said source of power and operative upon closure of said circuit closure means to energize said one of said windings in an opposite direction tending to urge said circuit closure means toward an open position; the counter E. M. F. generated by said armature upon energization thereof operating to modify the effective operation of said primary controller in said first circuit means; and an energization storing circuit means connected across said supply when said circuit closure means is operated to a circuit closure position and discharging through said one of said windings in such a direction as to urge said circuit closure means toward said open position.

5. In motor control apparatus: a motor whose speed and direction of rotation is to be controlled, said motor having an armature and a pair of directional field windings, an energizing circuit means for said motor connected to said armature and said directional field windings including a circuit closure means for controlling the operation of said energizing circuit means, electromagnetic means for operating said circuit closure means, an energized primary controlling means, means connecting said electromagnetic means to said primary controlling means of said armature such that said electromagnetic means is energized from said primary controlling means and the counter E. M. F. of said armature, further electromagnetic means connected to said circuit closure means and energized in one direction upon operation of said circuit closure means to a circuit closure position to provide snap action type of operation of said circuit closure means toward said circuit closure position, a resistance-capacitance circuit means connected to said first named electromagnetic means and said circuit closure means and energized upon operation of said circuit closure means to said closed position for modifying the operation of said circuit closure means, switching means included in said energizing circuit means for said field windings and operatively substantially simultaneously with the energization of said first named electromagnetic means, and means adapted to be operated upon a need for operation of said motor for controlling the operation of said primary controlling means.

6. In motor control apparatus: a motor whose speed and direction of rotation is to be controlled, said motor having an armature and a pair of directional field windings, an energizing circuit means for said motor connected to said armature and said directional field windings including a circuit closure means for controlling the operation of said energizing circuit means, electromagnetic means for operating said circuit closure means, an energized primary controlling means, means connecting said electromagnetic means to said primary controlling means of said armature such that said electromagnetic means is energized from said primary controlling means and the counter E. M. F. of said armature, further electromagnetic means connected to said circuit closure means and energized upon operation of said circuit closure means to a circuit closure position to provide positive operation of said circuit closure means toward said circuit closure position, a resistance-capacitance circuit means connected to said first named electromagnetic means and said circuit closure means and energized upon operation of said circuit closure means to said closed position for modifying the operation of said circuit closure means, condenser means connected to said first named electromagnetic means and said circuit closure means modifying the energization of said first named electromagnetic means upon closure of said circuit closure means for modifying with said further electromagnetic means and said resistance-capacitance circuit means the amount of current supplied to said armature in proportion to the operation of said primary controller, switching means included in said energizing circuit means for said field windings and operatively substantially simultaneously with the energization of said first named electromagnetic means, and means adapted to be operated upon a need for operation of said motor for controlling the operation of said primary controlling means.

7. In motor control apparatus: a motor whose speed and direction of rotation is to be controlled, said motor having an armature and a pair of directional field windings, an energizing circuit means for said motor connected to said armature and said directional field windings including a circuit closure means for controlling the operation of said energizing circuit means, first relay coil for operating said circuit closure means, an energized primary controlling means, means connecting said first relay coil to said primary controlling means of said armature such that said first relay coil is energized from said primary controlling means and the counter E. M. F. of said armature, a second relay coil connected to said circuit closure means and energized upon operation of said circuit closure means to a circuit closure position to provide positive operation of said circuit closure means toward said circuit closure position, a resistance-capacitance circuit means connected to said first named relay coil and said circuit closure means and energized upon operation of said circuit closure means to said closed position for modifying the operation of said circuit closure means, condenser means connected to said first named relay coil and said circuit closure means modifying the energization of said first named relay coil upon closure of said circuit closure means for modifying with said second relay coil and said resistance-capacitance circuit means the amount of current supplied to said armature in proportion to the operation of said primary controller, switching means included in said energizing circuit means for said field windings and operatively substantially simultaneously with the energization of said first named relay coil, and means adapted to be operated upon a need for operation of said motor for controlling the operation of said primary controlling means.

8. In motor control apparatus: a motor whose speed and direction of rotation is to be controlled, said motor having an armature and a directional field winding, an energizing circuit means for said motor connected to said armature and said directional field winding, circuit closure means included in said energizing circuit means for controlling the energization of said armature, electromagnetic means for operating said circuit closure means, an energized primary controller, means connecting said electromagnetic means to said primary controller and said armature such so that an electromagnetic means is energized from said primary controller and from the counter E. M. F. of said armature, further electromagnetic means connected to said circuit closure means and energized upon operation of said circuit closure means to a closed position to operate said circuit closure means toward said circuit closure position for positive closure of said circuit means, and resistance-capacitance circuit means connected to said first named electromagnetic means and said circuit closure means and energized upon operation of said circuit closure means to a closed position for modifying the operation of said circuit closure means by said primary controller, and manual means operatively connected to said primary controller and adapted to operate said controller.

9. In motor control apparatus: a motor whose speed and direction of rotation is to be controlled, said motor having an armature and a directional field winding, an energizing circuit means for said motor connected to said armature and said directional field winding, circuit closure means included in said energizing circuit means for controlling the energization of said armature, electromagnetic means for operating said circuit closure means, an energized primary controller, means connecting said electromagnetic means to said primary controller and said armature such that said electromagnetic means is energized from said primary controller and from the counter E. M. F. of said armature, further electromagnetic means connected to said circuit closure means and energized upon operation of said circuit closure means to a closed position to operate said circuit closure means toward said circuit closure position for positive closure of said circuit closure means, resistance-capacitance circuit means connected to said first named electromagnetic means and said circuit closure means and energized upon operation of said circuit closure means to a closed position for modifying the operation of said circuit closure means by said primary controller, condenser means connected to said first named electromagnetic means and said circuit closure means modifying the energization of said first named electromagnetic means upon closure of said circuit closure means for modifying with said further electromagnetic means and said resistance-capacitance circuit means the operation of said circuit closure means in proportion to the operation of said primary controller, and manual means operatively connected to said primary controller and adapted to operate said controller.

10. In motor control apparatus: a motor whose speed and direction of rotation is to be controlled, said motor having an armature and a directional field winding, an energizing circuit means for said motor connected to said armature and said directional field winding, circuit closure means included in said energizing circuit means for controlling the energization of said armature, electromagnetic means for operating said circuit closure means, a primary controller connected to and energized from said energizing circuit means, means connecting said electromagnetic means to said primary controller and said armature such that said electromagnetic means is energized from said primary controller and from the counter E. M. F. of said armature, further electromagnetic means connected to said circuit closure means and energized upon operation of said circuit closure means to a closed position to operate said circuit closure means toward said circuit closure position for positive closure of said circuit closure means, and resistance-capacitance circuit means connected to said first named electromagnetic means and said circuit closure means and energized upon operation of said circuit closure means to a closed position for modifying the operation of said circuit closure means by said primary controller, condenser means connected to said first named electromagnetic means and said circuit closure means modifying the energization of said first named electromagnetic means upon closure of said circuit closure means for modifying with said further electromagnetic means and said resistance-capacitance circuit means the operation of said circuit closure means in proportion to the operation of said primary controller, switching means connected in parallel with said primary controller and to said first named electromagnetic means and operative to short out said primary controller and apply full energization to said first named electromagnetic means, and manual means operatively connected to said primary controller and said switching means and adapted to operate said controller over a predetermined range of movement before operating said switching means.

11. In a motor control apparatus: a motor whose speed and direction of rotation is to be controlled, said motor having an armature and a pair of directional field windings, an energizing circuit means for said motor connected to said armature and said directional field windings, circuit closure means included in said energizing circuit means for controlling the energization of said armature, electromagnetic means for operating said circuit closure means, an energized primary controller, means connecting said electromagnetic means to said primary controller and said armature such so that an electromagnetic means is energized from said primary controller, switching means included in said energizing circuit means for said directional field windings, further electromagnetic means connected to said circuit closure means and energized upon operation of said circuit closure means to a closed position to operate said circuit closure means toward said circuit closure position for positive closure of said circuit closure means, resistance-capacitance circuit means connected to said first named electromagnetic means and said circuit closure means and energized upon operation of said circuit closure means to a closed position for modifying the operation of said circuit closure means by said primary controller, and manual means operatively connected to said primary controller and said switching means and adapted to simulta- neously operate said controller and said switching means.

12. In a motor control apparatus: a motor whose speed and direction of rotation is to be controlled, said motor having an armature and a pair of directional field windings, an energizing circuit means for said motor connected to said armature and said directional field windings, circuit closure means included in said energizing circuit means for controlling the energization of said armature, electromagnetic means for operating said circuit closure means, an energized primary controller, means connecting said electromagnetic means to said primary controller and said armature such that said electromagnetic means is energized from said primary controller, switching means included in said energizing circuit means for said directional field windings, further electromagnetic means connected to said circuit closure means and energized upon operation of said circuit closure means to a closed position to operate said circuit closure means toward said circuit closure position for positive closure of said circuit closure means, resistance-capacitance circuit means connected to said first named electromagnetic means and said circuit closure means and energized upon operation of said circuit closure means to a closed position for modifying the operation of said circuit closure means by said primary controller, condenser means connected to said first named electromagnetic means and said circuit closure means modifying the energization of said first named electromagnetic means upon closure of said circuit closure means for modifying with said further electromagnetic means and said resistance-capacitance circuit the amount of current supplied to said armature in proportion to the operation of said primary controller, and manual means operatively connected to said primary controller and said switching means and adapted to simultaneously operate said controller and said switching means.

13. In a motor control apparatus: a motor whose speed and direction of rotation is to be controlled, said motor having an armature and a pair of directional field windings, an energizing circuit means for said motor connected to said armature and said directional field windings, circuit closure means included in said energizing circuit means for controlling the energization of said armature, electromagnetic means for operating said circuit closure means, an energized primary controller, means connecting said electromagnetic means to said primary controller and said armature such that said electromagnetic means is energized from said primary controller, switching means included in said energizing circuit means for said directional field windings, further electromagnetic means connected to said circuit closure means and energized upon operation of said circuit closure means to a closed position to operate said circuit closure means toward said circuit closure position for positive closure of said circuit closure means, resistance-capacitance circuit means connected to said first named electromagnetic means and said circuit closure means and energized upon operation of said circuit closure means to a closed position for modifying the operation of said circuit closure means by said primary controller, further switching devices connected in parallel with said primary controller and to said first named electromagnetic means being operative to short out said primary controller and apply full energization to said first named electromagnetic means overcoming the effect of said resistance-capacitance circuit of said furthering condenser means, and manual means operatively connected to said primary controller and said first and second named switching means and adapted to simultaneously operate said controller and said first named switching means and after a predetermined range of operation said second named switching means.

14. In a motor control apparatus: a motor whose speed is to be controlled, said motor having an armature and directional field windings, an energizing circuit means for said motor adapted to be connected to a source of power and including said armature and said field windings, relay means including contact means operated by a pair of operating coils, said contact means being included in said energizing circuit means in series with said armature to control an operation of said energizing circuit means, a primary controller adapted to be energized from said source of power, means connecting one of said relay coils to said primary controller and said energizing circuit such that the coil is energized from said primary controller and from the counter E. M. F. of said armature, switching means connected to said energizing circuit means and in a series of relationship with said directional field windings for connecting at least one of said field windings in said energizing circuit means for each of a pair of operating positions of said switching means, manual means operatively connected to said primary controller and said switching means and adapted to simultaneously operate said primary controller and said switching means to vary the energization of said first of said relay coils and said armature and operate said switching means to one or the other of the operating positions to energize one or the other of said field windings, the second of said relay coils being connected to said contact means and energized upon operation of said contact means to provide for positive operation of said contact means toward a closed position, a resistance-capacitance circuit means connected to said first relay coil and to said contact means and energized upon operation of said contact means to a closed position for modifying energization of said first relay coil.

15. In a motor control apparatus: a motor whose speed is to be controlled, said motor having an armature and directional field windings, an energizing circuit means for said motor adapted to be connected to a source of power and including said armature and said field windings, relay means including contact means operated by a pair of operating coils, said contact means being included in said energizing circuit means in series with said armature to control an operation of said energizing circuit means, a primary controller adapted to be energized from said source of power, means connecting one of said relay coils to said primary controller and said energizing circuit such that the coil is energized from said primary controller and from the counter E. M. F. of said armature, switching means connected to said energizing circuit means and in a series or relationship with said directional field windings for connecting at least one of said field windings in said energizing circuit means for each of a pair of operating positions of said switching means, manual means operatively connected to said primary controller and switching means and adapted to simultaneously operate said primary controller and said switching means to vary the energization of said first of said relay coils and said armature and operate said switching means to one or the other of the operating positions to energize one or the other of said field windings, the second of said relay coils being connected to said contact means and energized upon operation of said contact means to provide for positive operation of said contact means toward a closed position, a resistance-capacitance circuit means connected to said first relay coil and to said contact means and energized upon operation of said contact means to a closed position for modifying energization of said first relay coil, and condenser means connected to said first relay coil and said contact means in series relation therewith and through a unidirectional current conducting means modifying energization of said first relay coil upon closure of said contact means for modifying with said second relay coil and said resistance-capacitance circuit the amount of current supplied to said armature in proportion to the operation of said primary controller.

16. In a motor control apparatus: a motor whose speed is to be controlled, said motor having an armature and directional field windings, an energizing circuit means for said motor adapted to be connected to a source of power and including said armature and said field windings, relay means including contact means operated by a pair of operating coils, said contact means being included in said energizing circuit means in series with said armature to control an operation of said energizing circuit means, a primary controller adapted to be energized from said source of power, means connecting one of said relay coils to said primary controller and said energizing circuit such that the coil is energized from said primary controller and from the counter E. M. F. of said armature, switching means connected to said energizing circuit means and in a series of relationship with said directional field windings for connecting at least one of said field windings in said energizing circuit means for each of a pair of operating positions of said switching means, manual means operatively connected to said primary controller and said switching means and adapted to simultaneously operate said primary controller and said switching means to vary the energization of said first of said relay coils and said armature and operate said switching means to one or the other of the operating positions to energize one or the other of said field windings, the second of said relay coils being connected to said contact means and energized upon operation of said contact means to provide for positive operation of said contact means toward a closed position, a resistance-capacitance circuit means connected to said first relay coil and to said contact means and energized upon operation of said contact means to a closed position for modifying energization of said first relay coil, condenser means connected to said first relay coil and said contact means in series relation therewith and through a unidirectional current conducting means modifying energization of said first relay coil upon closure of said contact means for modifying with said second relay coil and said resistance-capacitance circuit the amount of current supplied to said armature in proportion to the operation of said primary controller, and further switching means connected in parallel with said primary controller and to said first relay coil and operative to short out said primary controller and applying full energization to said first relay coil overcoming the effect of said resistance-capacitance circuit and said condenser means, said further switching means being connected to said manual means and operative only after a predetermined amount of movement of said manual means.

17. In a motor control apparatus: a motor whose speed and direction of rotation is to be controlled, said motor having an armature and a pair of directional field windings, an energizing circuit means for said motor and connected to said armature and said directional field windings, circuit closure means included in said energizing circuit means for controlling the energization of said armature, electromagnetic means for operating said circuit closure means, an energized primary controlling means, means connecting said electromagnetic means to said primary controlling means and said armature such that said electromagnetic means is energized in part from said primary controller, switching means included in said energizing circuit means for said field windings and operative with the energization of said electromagnetic means, means operatively connected to said primary controller for controlling the operation of the same, further electromagnetic means and a condenser connected to said circuit closure means and said energizing circuit being energized upon operation of said circuit closure means toward a closed circuit to provide for snap action operation of said circuit closure means toward said circuit closure position and upon opening of said circuit closure means and discharge of said condenser being energized to provide for snap action of said circuit closure means toward circuit open position, an energy storing circuit means connected to said first named electromagnetic means and said circuit closure means and energized from said energizing circuit means upon operation of said circuit closure means to a circuit closure position for modifying the operation of said circuit closure means by said first named electromagnetic means.

18. In a motor control apparatus: a motor whose speed and direction of rotation is to be controlled, said motor having an armature and a pair of directional field windings, an energizing circuit means for said motor and connected to said armature and said directional field windings, circuit closure means included in said energizing circuit means for controlling the energization of said armature, electromagnetic means for operating said circuit closure means, an energized primary controlling means, means connecting said electromagnetic means to said primary controlling means of said armature such that said electromagnetic means is energized in part from said primary controller, switching means included in said energizing circuit means for said field windings and operative with the energization of said electromagnetic means, means operatively connected to said primary controller for controlling the operation of the same, further electromagnetic means connected to said circuit closure means and said energizing circuit and energized upon operation of said circuit closure means toward a closed circuit to provide for positive operation of said circuit closure means toward said circuit closure position, an energy storing circuit means connected to said first named electromagnetic means and said circuit closure means and energized from said energizing circuit means upon operation of said circuit closure means to a circuit closure, a position for modifying the operation of said circuit closure means by said first named electromagnetic means, and second energy storing means connected to said first named electromagnetic means said circuit closure means and through a unidirectional current conducting device for modifying with said further electromagnetic means and said first said energy storing circuit the amount of current supplied to said armature in proportion to the operation of said primary controller.

19. In a motor control apparatus: a motor whose speed and direction of rotation is to be controlled, said motor having an armature and a pair of directional field windings, an energizing circuit means for said motor and connected to said armature and said directional field windings, circuit closure means included in said energizing circuit means for controlling the energization of said armature, electromagnetic means for operating said circuit closure means, primary controlling means connected to and energized from said energizing circuit, means connecting said electromagnetic means to said primary controlling means of said armature such that said electromagnetic means is energized in part from said primary controller, switching means included in said energizing circuit means for said field windings and operative with the energization of said electromagnetic means, means operatively connected to said primary controller for controlling the operation of the same, further electromagnetic means connected to said circuit closure means and said energizing circuit and energized upon operation of said circuit closure means toward a closed circuit to provide for positive operation of said circuit closure means toward said circuit closure position, an energy storing circuit means connected to said first named electromagnetic means and said circuit closure means and energized from said energizing circuit means upon operation of said circuit closure means to a circuit closure position for modifying the operation of said circuit closure means by said first named electromagnetic means, and second energy storing means connected to said first named electromagnetic means, said circuit closure means and through a unidirectional current conducting device for modifying with said further electromagnetic means and said first said energy storing circuit the amount of current supplied to said armature in proportion to the operation of and primary controller, said further switching means being operatively connected to said means operating said primary controller and operated thereby for shunting out said primary controller for a predetermined range of movement of said operating means.

No references cited.